United States Patent [19]

Albrecht et al.

[11] Patent Number: 5,259,644
[45] Date of Patent: Nov. 9, 1993

[54] IGNITION UNIT, IN PARTICULAR FOR AN AIR BAG GAS GENERATOR

[75] Inventors: Uwe Albrecht, Nuremberg; Anton Bretfeld, Furth; Josef Kraft, Berg, all of Fed. Rep. of Germany

[73] Assignee: Dynamit Nobel Aktiengesellschaft, Trosidorf, Fed. Rep. of Germany

[21] Appl. No.: 800,044

[22] Filed: Nov. 29, 1991

[30] Foreign Application Priority Data

Nov. 28, 1990 [DE] Fed. Rep. of Germany ....... 4037770

[51] Int. Cl.⁵ ............................................ B60R 21/26
[52] U.S. Cl. ................................... 280/741; 102/470; 102/204; 102/531
[58] Field of Search .............. 280/728, 736, 740, 741, 280/742, 730, 731, 735; 102/470, 204, 202.5, 202.9, 530, 531; 422/164, 165, 166; 60/256; 137/68.2

[56] References Cited

U.S. PATENT DOCUMENTS

| | | | |
|---|---|---|---|
| 3,024,728 | 3/1962 | Trevorrow | 102/202.5 |
| 3,135,200 | 6/1964 | Jackson | 102/202.9 |
| 3,332,353 | 7/1967 | Burkardt | 60/256 |
| 3,878,969 | 4/1975 | Prochazka et al. | 102/531 |
| 3,960,390 | 6/1976 | Goetz | |
| 3,985,076 | 10/1976 | Schneiter et al. | 280/741 |
| 3,986,456 | 10/1976 | Doin et al. | 280/741 |
| 4,021,058 | 5/1977 | Suzuki | 137/68.2 |
| 4,722,661 | 2/1988 | Adams | |
| 4,796,912 | 1/1989 | Lauritzen et al. | 422/166 |
| 5,000,479 | 3/1991 | Werner et al. | 280/741 |

FOREIGN PATENT DOCUMENTS

| | | |
|---|---|---|
| 0168688 | 1/1986 | European Pat. Off. |
| 0180408 | 5/1986 | European Pat. Off. |
| 2150744 | 4/1978 | Fed. Rep. of Germany |
| 3738436 | 11/1988 | Fed. Rep. of Germany |
| 3924500 | 12/1990 | Fed. Rep. of Germany |
| 3937032 | 5/1991 | Fed. Rep. of Germany ...... 280/736 |

Primary Examiner—Karin L. Tyson
Attorney, Agent, or Firm—Antonelli, Terry, Stout & Kraus

[57] ABSTRACT

An ignition unit is provided with an internal housing defining a chamber in which an ignition charge and an ignition element igniting the charge are accommodated. The housing defining the chamber consists of a cover and a container which are connected to one another along a circumferential groove. A distributor housing is mounted on to the housing forming the chamber, in which distributor housing gas outlet openings are provided which are closed by a cap-shaped cover of the chamber. The V-shaped circumferential groove represents a predetermined breaking or separation position of the chamber, for which reason the cover is separated from the container when the ignition charge is ignited. The cover moves away from the container into a space until it strikes the upper end of the distributor housing. With its movement relative to the distributor housing, the cover releases the gas outlet openings so that the gases and flames can emerge from the ignition unit.

9 Claims, 3 Drawing Sheets

IGNITION UNIT, IN PARTICULAR FOR AN AIR BAG GAS GENERATOR

BACKGROUND OF THE INVENTION

The invention concerns an ignition unit, in particular for an air bag gas generator, having a chamber in which an ignition element and an ignition charge ignitable by it are arranged, with the chamber having at least one opening which is closed and which opens when the ignition charge is ignited for the emergence of the ignition gases from the chamber.

An ignition unit of this kind is known from U.S. patent Ser. No. 4 437 681. The ignition unit is provided with a cylindrical chamber in which a electrically controllable ignition element and an ignition charge ignitable by it are accommodated. The cylinder wall of the chamber is provided with several openings which are closed by a foil or the like. The chamber is arranged in the housing of a gas generator and is surrounded in the latter by the gas-developing material (the pressure-gas-producing charge or the powder bed). As soon as the ignition charge is ignited by the ignition element, the openings open as a consequence of the pressure increase within the chamber and the hot gases arising with the ignition, so that the gases or the flame reach the pressure-gas-producing charge, which is ignited, via the openings. In practice it is not guaranteed that the openings of the chamber are all opened at the same time. Rather it happens that the foil is destroyed first of all in the region of a few openings. Due to the release of pressure occurring therewith, the remaining openings only open at a later point in time or possibly not at all. In this way the required even ignition of the pressure-gas-producing charge is not guaranteed.

SUMMARY OF THE INVENTION

The object of the invention is to create an ignition unit of the type described above, in particular for an air bag gas generator or for the propellant charge igniter of cartridge ammunition of smaller and greater caliber, which ignites the pressure-gas-producing charge evenly and in which the ignition vapors (hot combustion products like gases, particles) emerge at the same time via all openings.

To achieve this object it is proposed with the invention that a housing defining the chamber containing the ignition element and associated charge is enclosed in the region of the at least one opening by a distributor housing defining a distributor space for the distribution of the gases of the ignition charge, with the distributing housing having several gas outlet openings which are all connected to the chamber by means of the distributor space defined by the distributor housing when the chamber is open.

According to the invention, in addition to the chamber, the ignition unit has another distributor housing with several gas outlet openings, the housing enclosing the chamber in the region of the opening, of which there is at least one. The distributor housing defines a distributor space around the chamber, in which space the gases or ignition vapors as well as flames distribute themselves evenly when the chamber is open. As soon as one of the openings of the chamber is opened when the ignition charge is ignited, the gases enter the distributor housing where the gases are carried away by means of the gas outlet openings, arranged in the housing, to the pressure-gas-producing charge. In the distributor housing the gases are also conducted to that region of the outer surface of the chamber in which the chamber openings arranged therein have not been opened by the ignited ignition charge. The gas outlet openings in the distributor housing are always open and are connected to the chamber when it is open via the distributor space. As a consequence of the distributor housing with the gas outlet openings arranged therein, the ignition unit in accordance with the invention delivers its ignition gases or ignition flames simultaneously in all directions.

The distributor housing can be welded to the housing forming the chamber, or chamber-forming housing and distributor housing can be inserted into one another. The use of the ignition unit in accordance with the invention is not limited to air bag gas generators; rather, the ignition unit can also be used as propellent charge igniter for cartridge ammunition of smaller caliber or, with a further subsequently connected intensifier charge, also for greater caliber. The gas outlet openings are arranged preferably so that they are evenly distributed over the distributor housing. Should the ignition indeed take place chiefly in a certain region of the distributor housing, a gas outlet opening concentration is to be undertaken in this region.

In accordance with an advantageous embodiment of the invention it is provided that the housing forming the chamber consists of a container and a cover, whose connection to one another is constructed as predetermined breaking or separating position, whereby the cover can be separated from the container when the ignition charge is ignited, and that the distributor housing surrounds the cover of the chamber and is firmly connected to the container, with the gas outlet openings being arranged in the distributor housing in such a way that they are closed by the cover when the cover is connected to the container and they are open when the cover is separated. The housing forming the chamber and distributor housing in this respect are advantageously inserted into one another, with the cap-shaped cover being capable of moving freely in the distributor housing after the break-up of the predetermined separating position. The gas outlet openings in the distributor housing are arranged in such a way that when the cover is connected to the container it closes the gas outlet openings from the inside and opens these openings when it is separated from the container. The predetermined breaking position can be constructed, for example, as star stamping in the front surface of the chamber-forming housing which is cylindrical in this respect; likewise a V-shaped groove in the chamber wall may be used, the groove being open towards the outside.

In the embodiment of the invention described previously, both the chamber-forming housing and the distributor housing each advantageously have the shape of a cylinder closed at one of its front sides (or of a casing closed at one front side). Both cylinder casings are inserted into one another in this respect.

As already pointed out above, in the region surrounding the cover the distributor housing is constructed in such a way that it captures or retains the cover which separates itself when the ignition charge is ignited. In an advantageous development of the invention, in this respect it is provided that between the cover and the distributor housing there is arranged an absorbing device which absorbs the impact of the cover on to the inner surface of the distributor housing. In this way the danger of the rupturing of the distributor housing as a consequence of the impact of the cover is counteracted and an uncontrolled ignition of the pressure-gas-producing charge is thereby prevented. The absorbing device preferably consists of a spring-elastic material applied onto the cover or arranged on the inner surface of the distributor housing, it being preferably a sealing ring of rubber fastened to the cover. The rubber sealing ring represents a particularly simple realization of the absorbing device. The kinetic energy of the cover, however, in accordance with a further advantageous embodiment of the invention, can also be converted into energy for the deformation of the distributor housing and the impact of the cover can thereby be absorbed. In this respect the cover is arranged in the distributor housing so that advantageously it can be displaced in a sliding manner; moreover, both the cover and the distributor housing (in the region which captures the cover) are constructed in a curved manner, with the curvature radius of the cover being smaller than that of the distributor housing. The cover is therefore "flatter" than the distributor housing in the region which captures the cover; the flat cover deforms the curved distributor housing, with the impact energy being converted into deformation energy and in this way a braking action is attained.

To influence the emergence with respect to time of the ignition vapors from the distributor housing when observed over its entire surface, in accordance with a further advantageous embodiment of the invention it is provided that the gas outlet openings of the distributor housing are arranged at different heights and/or have different diameters. In this way the ignition unit is given an ignition vapor emergence characteristic.

The opening of the chamber is preferably constructed in the chamber wall, with the distributor housing surrounding the chamber in the region between the chamber opening and the gas outlet openings at a distance. The opening in the chamber wall in this respect is preferably closed by a thin foil (of the casing) abutting the inner surface of the chamber or by a stopper. Both the casing and the stopper are destroyed when the ignition charge is ignited, so that the gases or flames reach the distributor housing without the separation of component parts of the chamber, for example the cover in accordance with the variant described above. Also, in this embodiment of the invention the chamber and the distributor housing each preferably has the shape of a cylinder closed on one side or of a casing closed on one side. In this respect the opening is arranged in the closed front surface of the chamber cylinder.

In another advantageous embodiment of the invention, moreover, it is provided that in the chamber wall portion, preferably in the cylindrical wall of a cylindrical chamber-forming housing, several openings are arranged and that the distributor housing forms an annular space around all the openings, with the gas outlet openings being aligned radially to the cylindrical chamber. In this development of the invention the chamber is only enclosed by the distributor housing in a relatively small region.

For the conduction and alignment of the ignition vapors, gases and flames issuing from the gas outlet openings, it is advantageously provided, moreover, that tubes with openings arranged in the tube walls are connected to the gas outlet openings. These tubes project relatively far into the pressure-gas-producing charge, and are therefore surrounded by the gas-producing material; in this respect one tube is provided per gas outlet opening.

In accordance with a further advantageous embodiment of the invention it is provided that, in the region which is not surrounded by the distributor housing, the chamber-forming housing, or the distributor housing, is provided with an outer knurled edge which presses itself into a carrier body receiving the chamber-forming housing or the distributor housing. In this way there results an unchanging positioning of the ignition unit in the carrier body receiving it. This positioning is necessary, for example, when the ignition unit is inserted into the carrier body of a tubular gas generator, since the gas outlet openings must then remain aligned in the direction of the longitudinal axis of the gas generator, this being guaranteed by the keying of the outer knurled edge with the carrier body.

BRIEF DESCRIPTION OF THE DRAWINGS

In the following description, different embodiments of the invention are described in more detail with reference to the accompanying drawings, wherein.

DETAILED DESCRIPTION OF THE INVENTION

Figure 1:
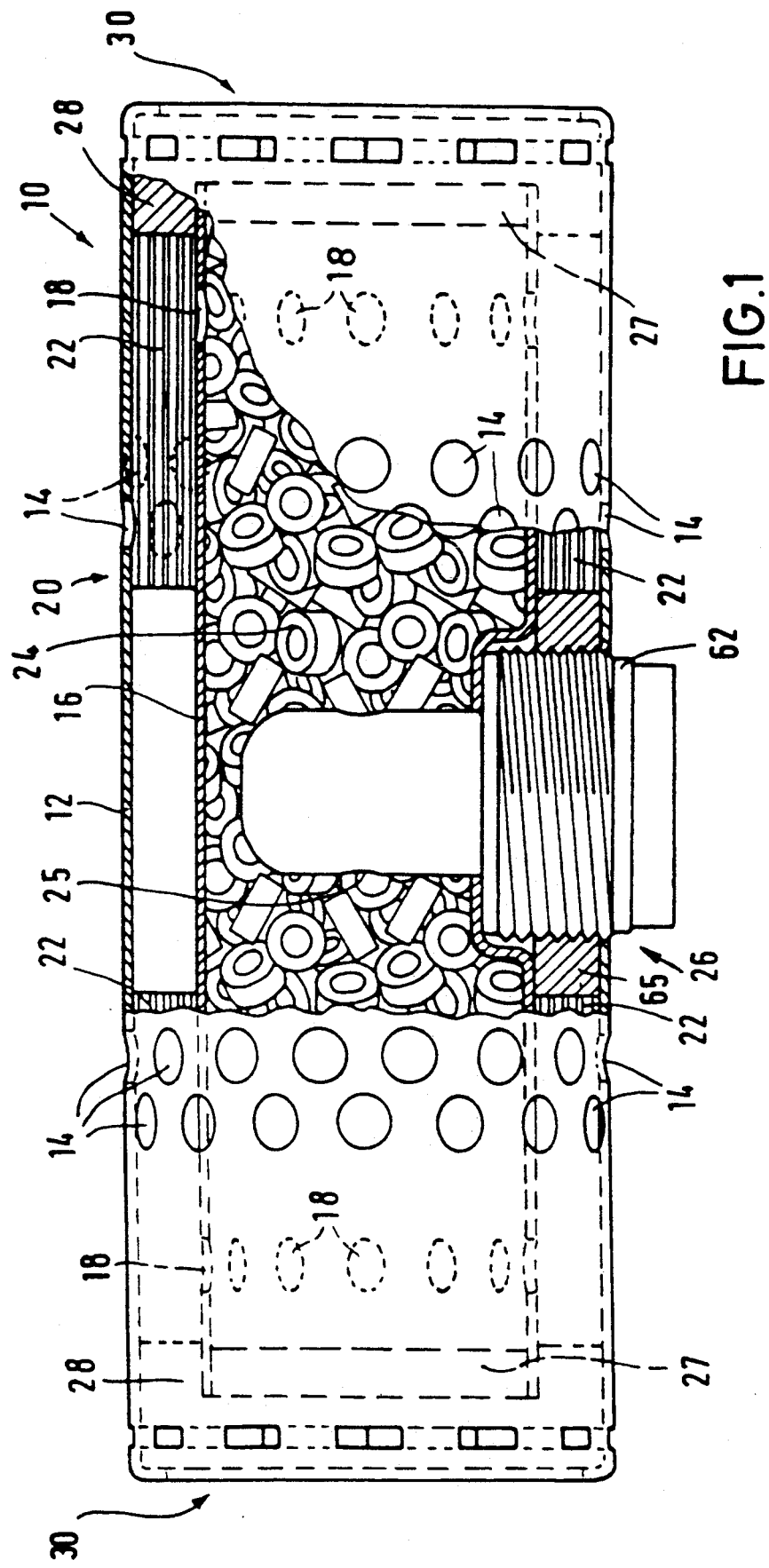
FIG. 1 shows a side view of an air bag gas generator, partially in section, with a central region being shown in cross section.

In FIG. 1 a tubular gas generator 10, in particular for a motor vehicle safety air bag, is illustrated, partially broken away and sectioned. The tubular gas generator 10 has an outer tube or casing 12 of steel, in the wall of which several gas outlet openings 14 are constructed. The gas outlet openings 14 are arranged so that the openings are evenly distributed over four circumferential rows of the outer tube 12. The gas outlet openings 14 are located substantially in the middle section of the outer tube 12 when observed in the axial longitudinal extension of the tubular gas generator. Within the outer tube 12 there is accommodated an inner tube 16 of steel arranged coaxially with the outer tube. In the axial end sections of the cylindrical wall of the inner tube 16 likewise gas outlet openings 18 are constructed, with these gas outlet openings 18 being arranged so that they are evenly distributed over two circumferential rows in the region of the end sections of the inner tube 16. There is therefore an axial distance between the gas outlet openings 14 of the outer tube 12 and the gas outlet openings 18 of the inner tube 16.

The outer diameter of the inner tube 16 is smaller than the inner diameter of the outer tube 12 so that an annular intermediate space 20 exists between the outer tube 12 and the inner tube 16. In the region extending between the gas outlet openings 14, 18 of the two tubes 12, 16 this annular intermediate space 20 is filled with metal filter packs 22 (wire-netting mats of steel).

The inner tube 16 is filled with gas-generating material based on sodium azide which produces pressure gas when the material burns. The gas-generating material, also termed a pressure-gas-producing charge, is present in the form of so-called pellets 24 which are accommodated in a disordered or random manner in the inner tube 16. An electrical ignition unit 26 for igniting the pressure-gas-producing charge is secured to the two tubes 12, 16 and projects partially into the inner tube 16 through an opening in the wall of inner tube 16.

The gas generator 10 is closed on the front ends 30 of the outer tube 12 by disc-like closure cover 28. At the ends of the inner tube 16 there are arranged spring-elastic, compressible disc elements 27 of ceramic felt or ceramic fabric, which are supported, on the one hand, against the pellets 24 and on the other hand against the inner surfaces of the closure covers 28, whereby the elements 27 hold the pellets 24 together by spring force. The resilient disc elements 27 have the object of equalizing the filling-quantity tolerances of the inner tube 16 and of holding the pellets 24 together even when the inner tube 16 is not completely filled with gas-generating material or when, in the course of time, the packing density of the pellets 24 increases through vibrations. The closure covers 28 consist of aluminium and also hold or position the inner tube 16.

The operation of the gas generator 10 shown in FIG. 1 is as follows: The electrical ignition unit 26, which in this embodiment is a so-called layer-bridge igniter with initiating substance, is ignited by a defined electrical pulse. When using the tube-gas generator in accordance with FIG. 1 as a pressure-gas generator in a vehicle air bag, this electrical pulse is applied to the ignition unit 26, for example, by closing an inertia switch in the event of a collision of the motor vehicle with another object. In the ignition unit 26, a so-called booster charge is ignited; the ignition vapors being produced thereby (flame, gas, hot combustion products) reach the inner space of the inner tube 16 via openings 25 provided in the housing of the ignition unit 26 and ignite there the (propellent charge) pellets 24 evenly and simultaneously. In the inner tube 16, according to the application, an appropriate quantity of gas-generating material is converted into gas with a pressure of about 200 bar. The hot gases, of which about 95% is nitrogen, reach the ends of the inner tube 16 via the gas outlet openings 18 and exit from the tube to the filter pack 22. The filter packs 22 have the object of cooling the gases and cleaning the gases of particles (solids) and condensates. The gases which are cooled and cleaned in this way emerge by means of the gas outlet openings 14 in the outer tube 12. The gas generator 10 described here produces a gas pressure of about 3 bar in a time of about 30 milliseconds in a test volume of 60 dm$^3$.

Figure 2:
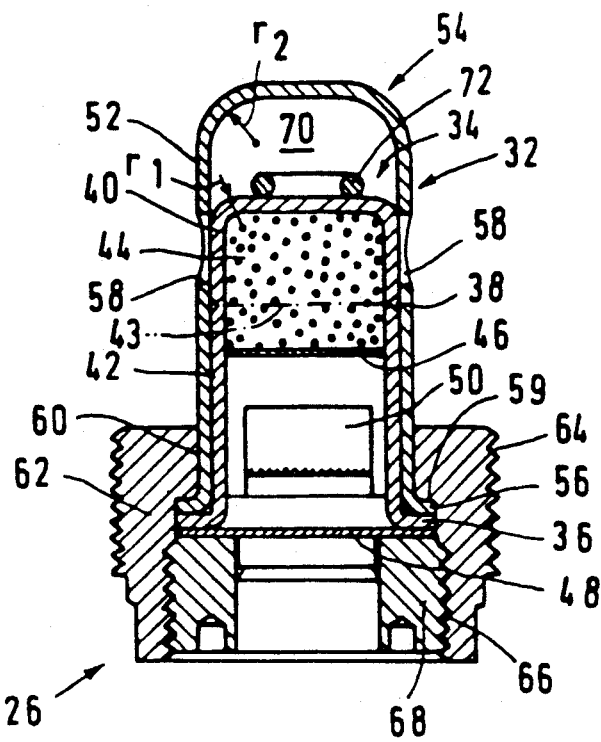
FIGS. 2 to 5, respectively, show various embodiments of an ignition unit—in a different scale—which can be used in the gas generator shown in FIG. 1.

A first embodiment for the ignition unit 26, schematically represented in FIG. 1, is shown in greater detail in FIG. 2. The ignition unit 26 has a substantially cartridge-shaped deep-drawn housing defining a chamber 32, the upper front end 34 of which is closed and which at the end directed away from this front end 34 has an annular outer flange 36. The chamber 32 is provided in its upper third with a closed circumferential groove 38 which is V-shaped when observed in cross section and is arranged in the outer side of the chamber 32. The circumferential groove 38 subdivides the chamber 32 into a cap-shaped cover 40 as well as a container 42 and defines an opening 43 in the container 42, the opening being closed by the cover 40. The cover 40 and the upper region of the container 42 are filled with an ignition charge 44 in the form of a compressed body which is covered with a foil 46 on its underside. At its lower end provided with the annular flange 36, the chamber 32 is closed by a disc-shaped plate 48 which is welded at its edge with the annular flange 36. The plate 48 carries on its inner side an ignition element 50 which is ignited, for example, electrically.

Mounted on to the cartridge-shaped housing forming chamber 32 is a distributor housing 52 which is likewise cartridge or casing-shaped, the axial length of the distributor housing being greater than that of the chamber 32. The housing 52 has a closed upper end 54 as well as an annular flange 56 on its other axial end. The distributor housing 52 is mounted on the chamber 32 or is firmly connected to it in the region of the container 42. In the cylindrical section of the distributor housing 52 there are constructed two gas outlet openings 58 which are displaced relative to one another by 180° and are positioned at the same height, the openings being closed by a circumferential section of the cap-shaped cover 40 when it is connected to the container 42.

The distributor housing 52 is inserted with the chamber 32 located therein into the through-passage 60 of a cylindrical carrier body 62, with the annular flange 56 abutting an annular packing 59 in the through-passage 60. The carrier body 62 has an outer thread 64 as well as, in its through-passage 60, an inner thread 66 which receives the thread of a threaded stopper 68 which abuts the plate 48 and which, by means of the plate 48 as well as the annular flange 36 of the chamber 32, presses the distributor housing 52 with its annular flange 56 against the annular packing in the through-passage 60. In this way the chamber and the distributor housing are held in a clamped manner between the carrier body 62 and the threaded stopper 68. The carrier body 62 can be screwed with its outer thread 64 into a holding body 65, which is not described here in more detail, of the gas generator 10 shown in FIG. 1.

In the assembly of the ignition unit 26, the following takes place. First of all the carrier body 62 is screwed into the housing wall (tubes 12, 16 with holding body 65 lying therebetween, see FIG. 1) of the gas generator 10. Subsequently, the distributor-housing casing 52 is inserted into the through-passage 60 of the carrier body 62 until its annular flange 56 abuts the annular packing 59. The distributor housing 52 is received by the through-passage 60 so that it cannot rotate, this being achieved by an outer knurled edge on the distributor housing 52 or an inner knurled edge within the through-passage. In this way the alignment of the openings 58 is fixed relative to the carrier body 62 and thus relative to the gas generator 10. Subsequently, the chamber 32 is inserted into the distributor housing 52 from below until its annular flange 36 abuts that of the distributor housing 52. Finally, the threaded stopper 68 is screwed into the carrier body 62 so that chamber 32 and distributor housing 52 are held so that they are firmly clamped.

The operation of the ignition unit represented in FIG. 2 will be described briefly as follows: As soon as the ignition element 50 is ignited electrically, it ignites the ignition charge 44, with the burning of which the gas pressure in the chamber 32 increases. By means of the V-shaped circumferential groove 38 a predetermined separation position is created in the wall of the chamber 32, the predetermined separation position breaking apart as soon as the gas pressure has exceeded a certain value. As a consequence of the increasing gas pressure, the cap-shaped cover 40 separates itself from the chamber container 42 and moves into the distributor space 70 above the cover 40 and defined by the distributor housing 52. When the cover 40 is separated, the opening 43 of the chamber 32 is opened. The cover 40 which is guided so that it can be displaced in a sliding manner in the distributor housing 52 bounces with relatively great force against the inner surface of the distributor housing 52 at its upper end 54. To absorb the impact, a rubber loop 72 is fastened on the cover 40, the loop capturing the greatest part of the kinetic energy of the cover 40. With its axial displacement in the distributor housing 52 the cap-shaped cover 40, whose circumferential section abuts the inner surface of the distributor housing 52, opens the gas outlet openings 58 more and more until finally they are completely open. As soon as the chamber 32 is open, i.e. as soon as the cover 40 releases itself from the container 42, the two gas outlet openings 58 are opened and indeed at the same time, this taking place advantageously by means of the separated cover 40. The V-shaped circumferential groove 38 guarantees a defined tamping for the conversion of the ignition charge, 44 whereby when observed over the circumference of the chamber 32, an even ignition of the pellets 24 shown in FIG. 1 being guaranteed with the ignition unit shown in FIG. 2.

Figure 3:
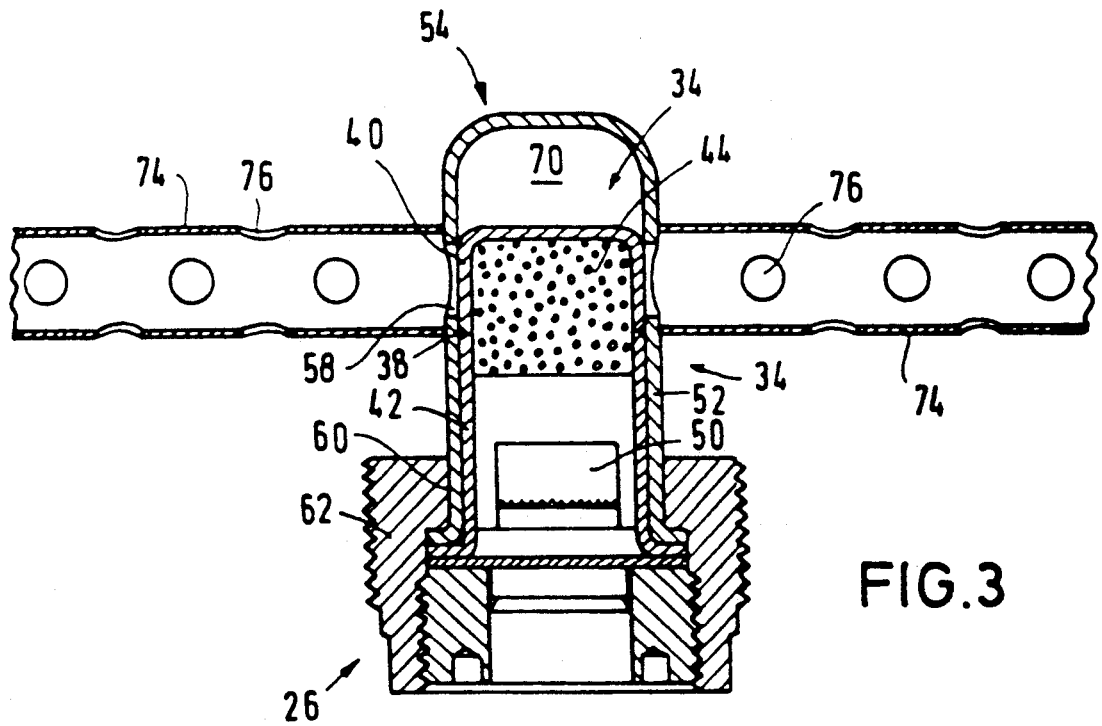

The ignition unit shown in FIG. 3 corresponds substantially with the ignition unit shown in FIG. 2; the same parts are accordingly also provided with the same reference numerals. As opposed to the ignition unit in accordance with FIG. 2, in the ignition unit of FIG. 3 so-called flame-conducting tubes 74 are provided which surround the gas outlet openings 58 and are connected to the distributor housing 52. The flame-conducting tubes 74 for their part have several openings 76 which are arranged so that the openings 76 are evenly distributed across the flame-conducting tubes 74. The flame-conducting tubes 74 project far, i.e. substantially into the pressure-gas-producing charge 24 (see FIG. 1) and thereby effect the ignition of this charge in the interior thereof. Moreover, in the ignition unit in accordance with FIG. 3, as opposed to that in accordance with FIG. 2, a rubber loop is not provided as absorbing device to absorb the impact of the cover 40 on the distributor housing 52. The conversion of the kinetic energy of the cap 40 takes place in the embodiment in accordance with FIG. 3 by means of a deformation of the distributor housing 52 in its upper end 54. For this purpose, the curvature, i.e. the curvature radius $r_2$ in the transition region between the cylindrical section of the distributor housing 52 and its upper end 54 is greater than is the case with the cover 40 of the chamber 32 (curvature radius $r_1$). The cover 40 therefore deforms the distributor housing 52 with the impact on to the internal side of the upper end 54, with a braking of the cover 40 taking place.

It is common to the ignition units represented in FIGS. 2 and 3 that, with the process giving rise to the gas pressure when the ignition charge 44 is ignited in the chamber 32, first of all a single predetermined separation position or zone (circumferential groove 38) opens up, this subsequently having an effect on the two gas outlet openings 58 already present. In this way one can avoid the disadvantage of many known constructions that all gas outlet openings are individually closed and must also be opened individually by means of the gas pressure being created.

Figure 4:
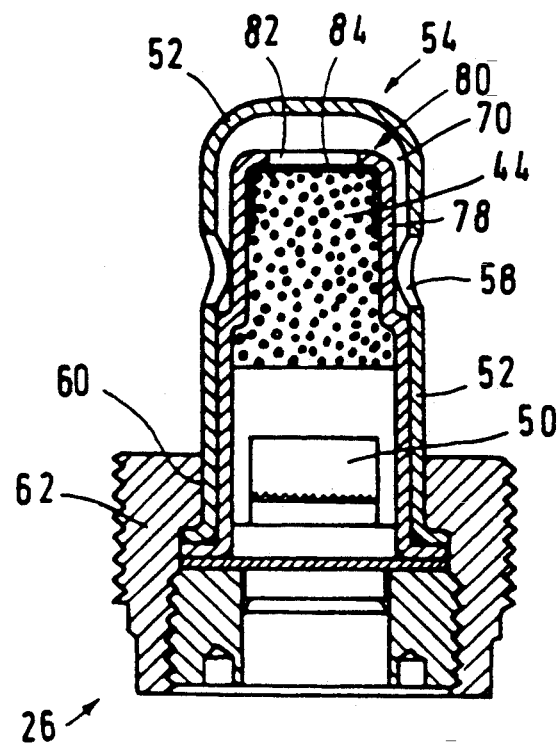

A further embodiment of the ignition unit 26 in accordance with arrangement shown in FIG. 1, is illustrated in FIG. 4. As far as the parts of this exemplifying embodiment correspond with the component parts of the ignition units in accordance with FIGS. 2 and 3, these parts are provided with the same reference numerals. The ignition unit in accordance with FIG. 4 is provided with a chamber 78 which is likewise substantially cartridge-shaped, the chamber being drawn in in its upper region, i.e. having a smaller diameter than in the lower region. Over its entire length the distributor housing 52 has the same inner diameter which is the same as the outer diameter of the chamber 78 in its lower region. The chamber 78 is loosely mounted within the distributor housing 52. In the forward end 80 of the chamber 78 a opening 82 is constructed which is closed by a thin-walled casing 84 arranged in the chamber 78. The tamping for the conversion of the ignition charge 44 can be adjusted by means of the wall thickness of the casing 84. Since the chamber 78 in its upper section is reduced in diameter, there is provided around the chamber 78 between the chamber 78 and the distributor housing 52 an annular distributor space 70 connected above the forward end 80, by means of which distributor space the gas outlet openings 58 are connected to the opening 82 in the chamber 78. Also in the embodiment of the ignition unit shown in FIG. 4, the opening of the opening 82 into the chamber 78 has an effect on two gas outlet openings at the same time.

Figure 5:
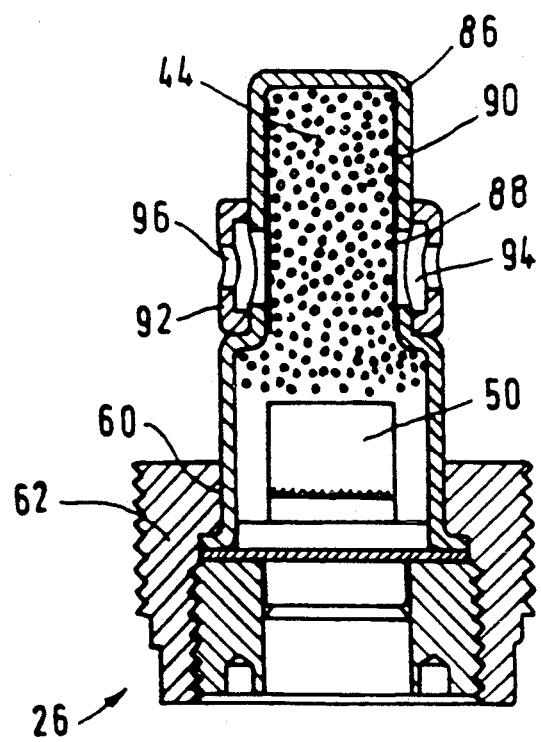

A final embodiment of the ignition unit shown in FIG. 1 is illustrated in FIG. 5. In this Figure the component parts which correspond with the parts of the ignition unit shown in the previous FIGS. 2 to 4 are provided with the same reference numerals. As with the embodiment in accordance with FIG. 4, also in the ignition unit according to FIG. 5, there is provided a chamber 86 tapered or reduced in diameter in its upper region. Constructed in the cylindrical wall of the chamber 86 are several openings 88 which are closed by a casing 90 which abuts the inner surface of the chamber 86. The tamping can be adjusted by means of the wall thickness of the casing 90. The chamber 86 is surrounded in the region of its openings 88 by the distributor housing 92 which is U-shaped when observed in section through the housing wall. The annular distributor housing 92 defines a distributor annular space 94 around the chamber 86. Constructed in the distributor housing 92 are two radially aligned diametrical gas outlet openings 96. The advantage of the embodiment shown in FIG. 5 consists in that the distributor housing 92 only encloses the region directly around the openings 88 of the chamber 86 and is therefore of a very small size. The gas outlet openings 96 in the distributor housing 92 ar flush with the chamber openings 88, but can also be rotated relative to these. The hot combustion products are conducted via the distributor annular space 94 even in that outer region of the chamber 86 in which the openings 88, which are arranged there, are not opened up. In this way, ignition vapors can reach the pressure-gas-producing charge via openings 96 of the distributor housing 92 which lie in this region.

What is claimed is:

1. An ignition unit for an air bag gas generator which comprises a cartridge-shaped housing defining:
   a chamber in which are arranged an ignition element and an ignition charge ignitable by the element, with the chamber having at least one opening which is closed and which opens for the emergence of ignition gases from the chamber when the ignition charge is ignited, characterized in that
   the chamber in the region of the at least one opening is enclosed by a distributor housing, which has several gas outlet openings that are all connected to the chamber via a space defined by the distributor housing when the at least one opening of the chamber is open;

the housing defining the chamber comprising a container and a cover with a connection therebetween formed as a predetermined separation zone, with the cover being separable from the container when the ignition charge is ignited, and in that the distributor housing surrounds the cover of the chamber, with the gas outlet openings being arranged in the distributor housing in such a way that when the cover is connected to the container, the gas outlet openings are closed by the cover, and when the cover is separated from the container, the gas outlet openings are open.

2. An ignition unit according to claim 1, characterized in that the cover can be retained by a region of the distributor housing.

3. An ignition unit according to claim 1 or 2, characterized in that between the cover and the distributor housing there is provided an absorbing device which absorbs the impact of the cover on to an inner surface of the distributor housing.

4. An ignition unit according to claim 3, characterized in that the absorbing device comprises a rubber sealing ring fastened on the cover.

5. An ignition unit according to claim 3, characterized in that the cover in the distributor housing can be displaced in a sliding manner and in that both the cover and the distributor housing in the region retaining the cover are constructed in a curved manner, with the curvature radium ($r_1$) of the cover being smaller than the radium ($r_2$) of the distributor housing.

6. An ignition unit according to claim 1, characterized in that the gas outlet openings are arranged at different heights and/or have different diameters.

7. An ignition unit according to claim 1, characterized in that the housing defining the chamber and the distributor housing each have the form of the cylinder closed at one front end, with the transition region between a cylindrical wall and a front surface being bent.

8. An ignition unit according to claim 7, characterized in that the at least one opening of the chamber wall is arranged in a closed front surface of the chamber.

9. An ignition unit according to claim 7, characterized in that the openings are arranged in a cylindrical wall of the chamber.

* * * * *